United States Patent
Pidutti et al.

[19]

[11] Patent Number: 6,040,687
[45] Date of Patent: Mar. 21, 2000

[54] NONLINEAR MULTIPLIER FOR SWITCHING MODE CONTROLLER

[75] Inventors: Albino Pidutti, Udine; Marco Alessandro Legnani, Saronno, both of Italy

[73] Assignee: STMicroelectronics S.R.L., Agrate Brianza, Italy

[21] Appl. No.: 09/187,084

[22] Filed: Nov. 5, 1998

[30] Foreign Application Priority Data

Nov. 10, 1997 [EP] European Pat. Off. ............. 97830584

[51] Int. Cl.[7] ...................................................... G05F 3/16
[52] U.S. Cl. ................................................................ 323/316
[58] Field of Search .................................. 323/315, 316, 323/317

[56] References Cited

U.S. PATENT DOCUMENTS

| | | |
|---|---|---|
| 4,525,663 | 6/1985 | Henry ...................................... 323/280 |
| 4,940,929 | 7/1990 | Williams . |
| 4,954,769 | 9/1990 | Kalthoff .................................. 323/313 |
| 5,264,780 | 11/1993 | Bruer et al. . |
| 5,359,276 | 10/1994 | Mammano . |

FOREIGN PATENT DOCUMENTS

| | | |
|---|---|---|
| 0 496 529 A2 | 1/1992 | European Pat. Off. . |
| 0 582 813 A2 | 6/1993 | European Pat. Off. . |

*Primary Examiner*—Shawn Riley
*Attorney, Agent, or Firm*—Theodore E. Galanthay; Allen, Dyer, Doppelt, Milbrath & Gilchrist, P.A.

[57] ABSTRACT

A control system provides an improvement in the stability and immunity to noise characteristics without degrading performance of the circuit by including a multiplier circuit that is purposely made nonlinear. A parameter K of the multiplier circuit is not a fixed value, but varies as a function of the error signal amplitude that is applied to one of the two inputs of the multiplier circuit. Advantageously, the parameter K of the multiplier circuit decreases when the amplitude of the error signal input thereto decreases.

19 Claims, 4 Drawing Sheets

6,040,687

NONLINEAR MULTIPLIER FOR SWITCHING MODE CONTROLLER

FIELD OF THE INVENTION

The present invention relates to analog circuits and, more particularly, to multiplier circuits for control loops in switching mode drive systems.

BACKGROUND OF THE INVENTION

In the field of DC—DC converters, switching mode power supply (SMPS) systems are included in power factor correction (PFC) systems. A control loop is commonly formed in an integrated form and includes a two signal multiplier. One input signal is commonly an error signal derived from a feedback line, while the other input signal may be, for example, representative of the value of the supply voltage or representative of another pertinent parameter.

An example application of a power factor correction (PFC) circuit follows the same configuration of a typical boost converter. The only difference being that the supply voltage is a rectified sinusoid voltage rather than a constant voltage, according to the prior art PFC stage shown in FIG. 1. The control block CONTROLLER of the PFC stage ensures that the current drawn from the AC line is sinusoidal and in phase with the main voltage VAC. This configuration provides the most efficient use of electric energy. Usually, the PFC stage is positioned between the AC line and the load, which is often represented by electronic circuits.

FIG. 2 shows a more detailed block diagram of a PFC stage according to the prior art. A feedback signal of the output voltage $V_{OUT}$ is applied to the inverting input of an operational amplifier OPA that outputs an error signal $V_{ERROR}$. This error signal $V_{ERROR}$ is applied to a first input of the multiplier circuit. The other input of the multiplier circuit is applied a portion of the rectified main voltage. The output signal of the multiplier circuit is used as a reference signal for the comparator and represents the current flowing through the power device. This reference signal is given by the expression:

$$R_{EFCS} = K^* V_{ERROR}^* V_{MULT}$$

where K represents the characteristic constant of the multiplier circuit.

The power device turns off when the current sensing resistor $R_{SENSE}$ detects a voltage higher than the output signal $R_{EFCS}$ of the multiplier. A turn on signal of the power device originates from the ZCD block and takes place upon a decrease to zero of the recirculating current in the inductor. In particular, the present invention concerns the multiplier circuit used in these types of applications.

In these applications, the control loop reduces unsatisfactory limits of stability and of immunity to the noise that may come from the AC line and/or originate from the system switchings. As far as stability is concerned, the open loop gain of the system illustrated in FIG. 2 is proportional to the square of the AC voltage, to the load resistance, and to the multiplier's constant K:

$$G_{LOOP} \propto V_{AC}^2 * R_{LOAD} * K \quad (1)$$

As a result of an increase in the main voltage and in the load resistance connected to the output of the circuit, the open loop gain increases which may cause instability. By reducing the value of the multiplier's constant K, the open loop gain is reduced. Also, the value of the constant K has a similar effect on the characteristics of immunity to noise.

SUMMARY OF THE INVENTION

A control system according to the invention provides for an improvement in the stability and immunity to noise characteristics without degrading performance of the circuit by including a multiplier circuit that is purposely made nonlinear. A parameter K of the multipler circuit is not a fixed value as in a common multiplier circuit, but instead varies as a function of the error signal amplitude that is applied to one of the two inputs of the multiplier circuit. Advantageously, the parameter K of the multiplier circuit decreases when the amplitude of the error signal input thereto decreases.

The nonlinearity of the multiplier circuit of the invention forces smaller and smaller amplitudes of the error signal by applying in an increasing number of layer amplitudes of the error signal until the multiplier circuit becomes practically linear. This characteristic is most effective in ensuring an enhanced stability and immunity to noise while maintaining desirable performances of the control system as a whole.

BRIEF DESCRIPTION OF THE DRAWINGS

The different aspects and advantages of the invention will become more evident through the following detailed description of the embodiments presented herein and by referring to the annexed drawings, wherein.

DETAILED DESCRIPTION OF THE PREFERRED EMBODIMENTS

Figure 1:
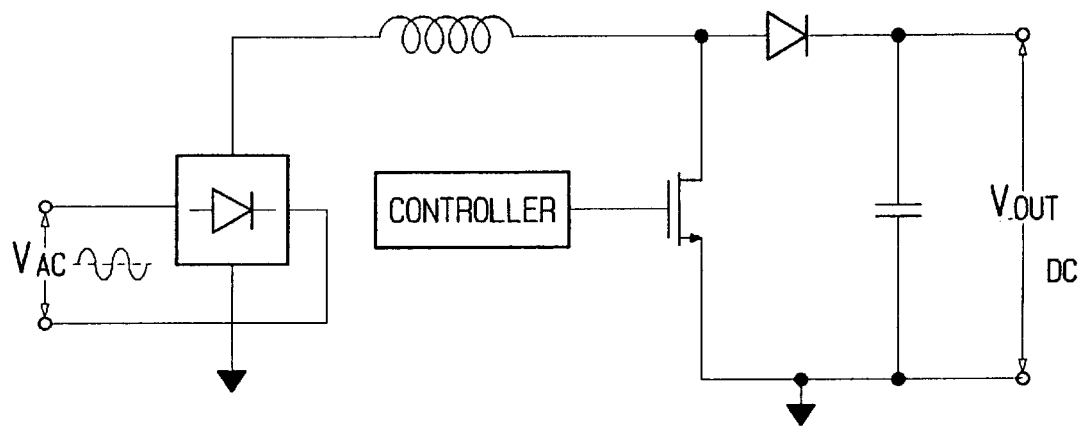
FIG. 1 shows a diagram of a PFC circuit according to the prior art.
Figure 3:
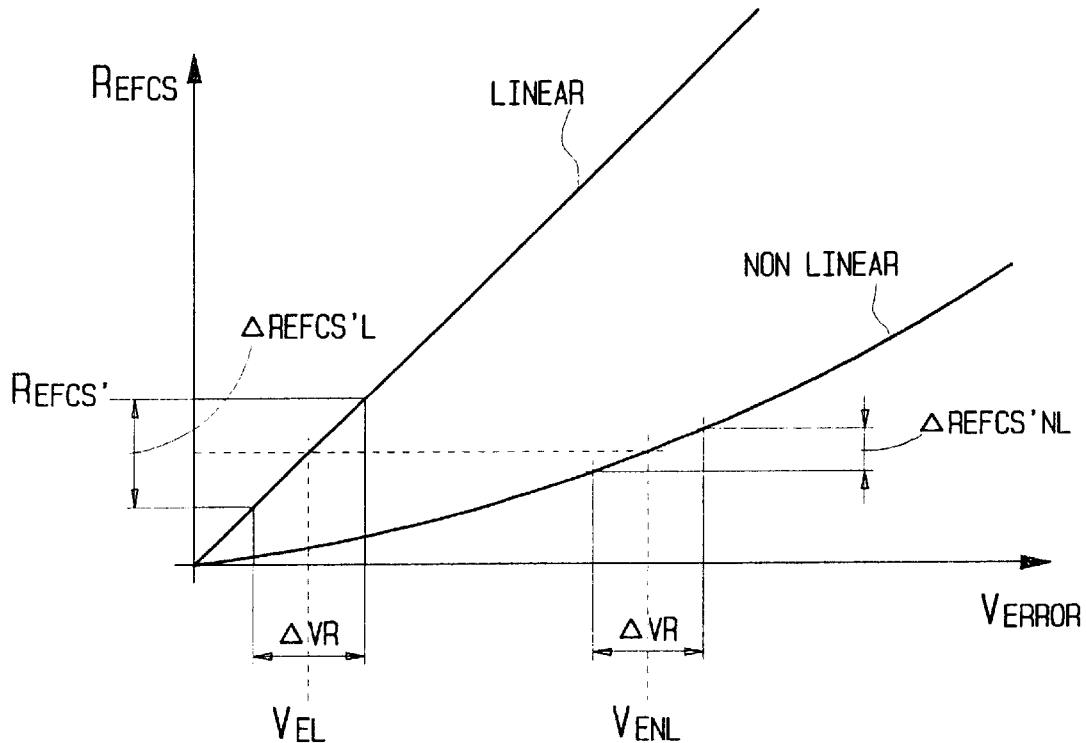
FIG. 3 shows a comparison between linear and nonlinear characteristics of a multiplier circuit according to the prior art.
Figure 2:
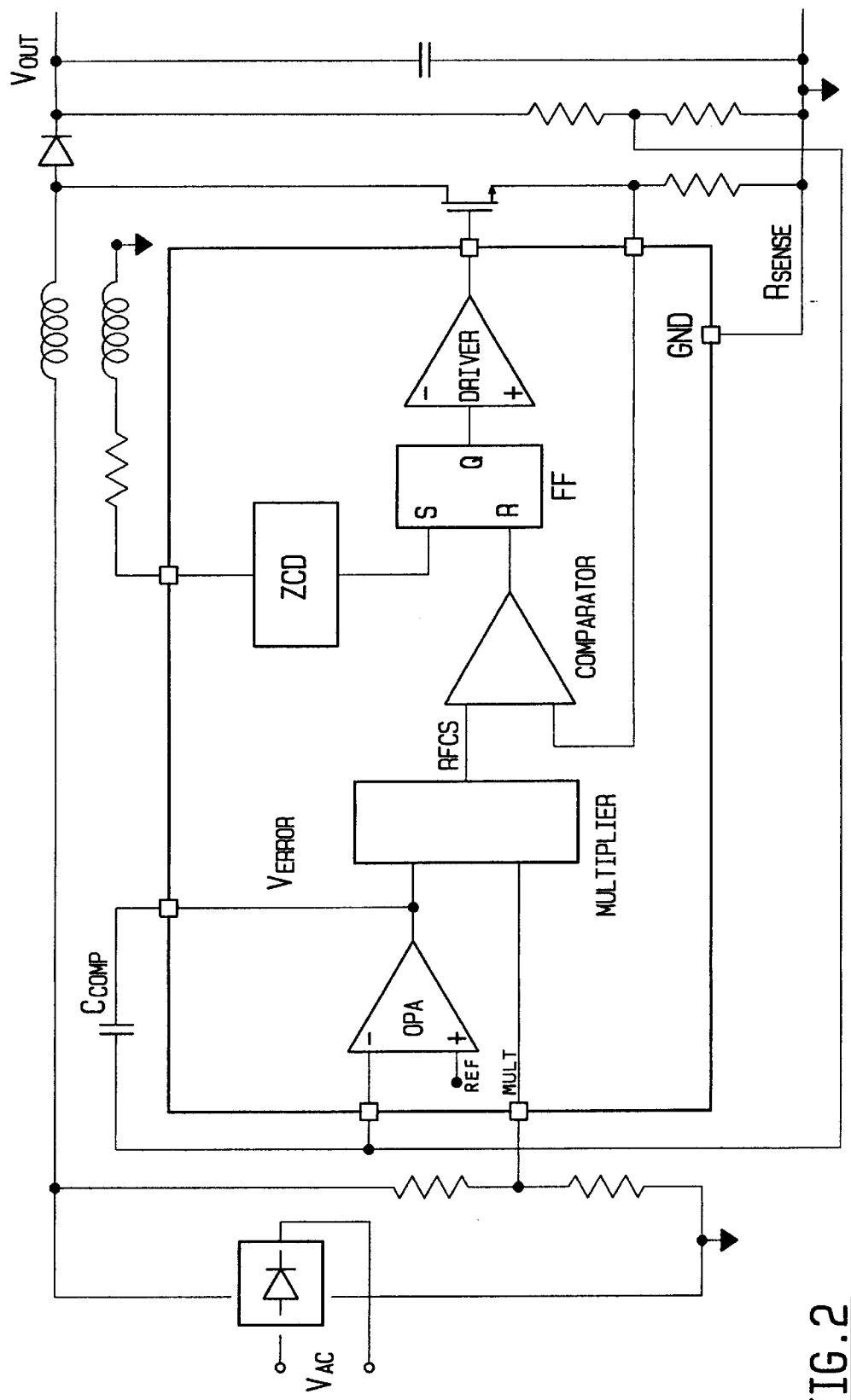
FIG. 2 shows a detailed diagram of the controller shown in FIG. 1 according to the prior art PFC circuit.

FIG. 3 shows the characteristics of a linear multiplier circuit and of a nonlinear multipler circuit (used alternatively in a control system as shown in FIG. 2), as a function of the error signal $V_{ERROR}$. It may be observed that for the same load $R_{EFCS} = R_{EFCS}$. The corresponding $V_{ERROR}$ signal is different in the two cases. In particular:

$$V_{EL}(\text{LINEAR CASE}) < V_{ENL}(\text{NONLINEAR CASE}) \quad (2)$$

Assuming noise of amplitude $\Delta VR$ is superimposed on $V_{EL}$ and $V_{ENL}$, it can be easily determined that the $R_{EFCS}$ variation is less in the case of a nonlinear characteristic:

$$\Delta R_{EFCS\ NL} < \Delta R_{EFCS\ L} \quad (3)$$

Figure 4:
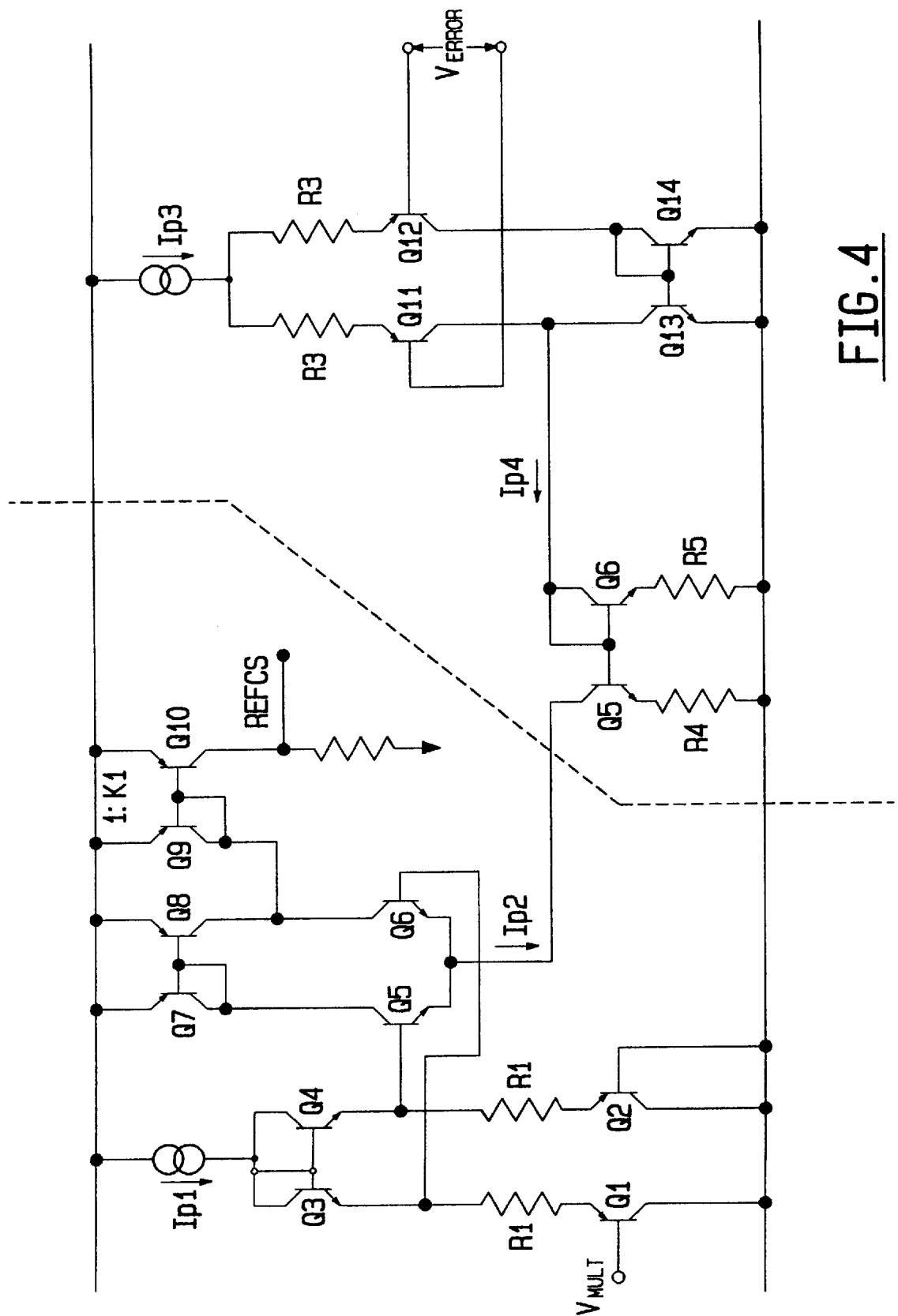
FIG. 4 shows a diagram of a nonlinear multiplier according to the invention.

A simplified circuit diagram of a multiplier according to the present invention is shown in FIG. 4. A dash line identifies on the left side portion of the circuit a functional circuit diagram of a typical multiplier circuit. On the right side of the dash line identifies the specific circuitry that makes nonlinear the behavior of the multiplier as a function of the $V_{ERROR}$ signal, according to this invention.

As shown on the left side of the dashed line, a structure of the multiplier circuit includes a first differential stage comprising Q1, Q2, R1, Q3, Q4, Ip1. This stage is strongly degenerated by the R1 resistors for increasing input dynamic range, through which is forced the bias current produced by the dedicated generator Ip1. The function of this first differential input stage is to convert the input signal $V_{mult}$ to a differential voltage signal between the emitters of Q3 and Q4 according to a linear to logarithmic conversion. Such a signal is applied to the respective input nodes of a second differential stage in cascade to the first stage. The second differential stage comprises transistors Q5, Q6, Q7 and Q8 which operate as a logarithmic to linear conversion of the differential input signal for providing an output current. The output current is mirrored by the current mirror formed by the transistors Q9 and Q10 on a resistor R2 across the terminals of which is generated the output signal $R_{EFCS}$ of the circuit.

The second argument of the multiplication is represented by a current signal Ip2 such that the functioning of the multiplier corresponds to the following function:

$$R_{EFCS} \approx V_{MULT} \frac{Ip2}{Ip1} \frac{R2}{R1} K1 \qquad (4)$$

From the above relationship, it is observed that the output signal REFCS is proportional to the input signals Vmult and Ip2. The constant K1 coinciding with the mirroring ratio of the output current mirror circuit is provided by the transistor pair Q9, Q10.

Referring to the circuit on the right side of the dashed line of FIG. 4, a third differential stage is strongly degenerated to increase its input dynamic range. The third differential stage includes the transistors Q11, Q12, Q13, Q14. The corresponding input dynamic range is increased by the degeneration resistors R3 and by the bias generator Ip3 and converts the differential input signal $V_{ERROR}$ to an output current Ip4 according to the equation:

$$Ip4 \approx \frac{1}{R3} V_{ERROR} \qquad (3)$$

All the relations considered up to now are linear. The current mirror includes a pair of transistors Q15 and Q16 and degeneration resistors R4 and R5 which applies the second signal Ip2 to the respective input of the multiplier circuit, as shown on the left side by the dash line. Normally, the current mirror used for this purpose has a certain mirror ratio n such that $$\frac{Ip2}{Ip4} = n \qquad (4)$$

Figure 5:
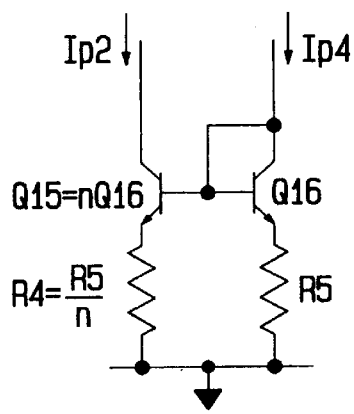
FIGS. 5 and 6 are partial diagrams that illustrate the way in which the multiplier circuit of FIG. 4 is made nonlinear, according to the invention.

Referring to FIG. 5, it is observed that Q15 has an emitter area equivalent to n times the emitter area of the transistor Q16 and the degeneration resistance of R4 has a value R5/n, thus obtaining the following relation $$R_{EFCS} = V_{MULT} * \frac{R5}{Ip1/R4} * K1 * n * \frac{V_{ERROR}}{R3} \qquad (5)$$

Therefore, the output signal $R_{EFCS}$ is a linear function to both input signals, $V_{MULT}$ and $V_{ERROR}$. In contrast, according to the present invention, the current mirror comprising Q15, Q16, R4 and R5 is deliberately made nonlinear by ensuring that the voltage drop on the respective degeneration resistors R4 and R5 is not the same for the linear mirrors of current.

Figure 6:
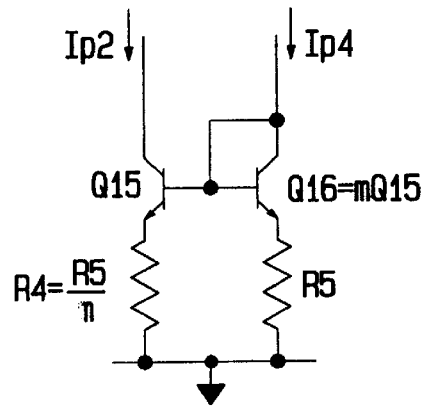

FIG. 6 shows the circuit of the current mirror modified according to the present invention, wherein the area ratio between the transistor pair Q15 and Q16 is made deliberately different from the ratio between the degeneration resistors R4 and R5. In practice, at low injection levels of current, the mirroring ratio is substantially given by $$\frac{Ip2}{Ip4} = \frac{1}{m}$$

where m is the area ratio between the two transistors Q15 and Q16. At high injection levels of current, the mirroring ratio becomes more identical to the ratio between the degeneration resistors, that is $$\frac{Ip2}{Ip4} = n$$

Figure 7:
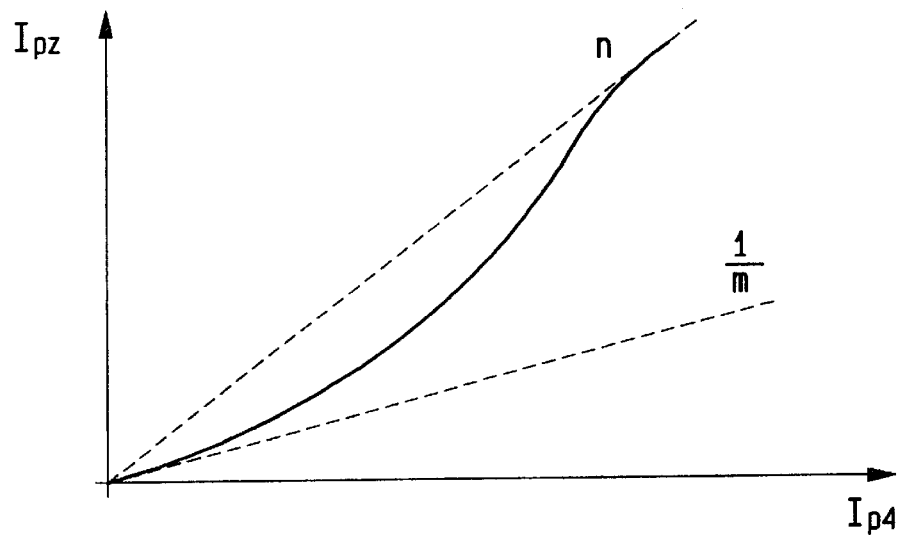
FIG. 7 shows a characteristic curve of the nonlinear multiplier according to the invention.

This particular characteristic is graphically illustrated in the diagram of FIG. 7 by having in the x-axis, indifferently, either the current Ip4 or the $V_{ERROR}$ signal. By the relative dimensioning of the circuit parameters, the range of accentuated nonlinearity may be easily designed to correspond to the expected dynamic range of the input signal $V_{ERROR}$. In this way, an enhanced stability and immunity to noise of the control loop is achieved, according to the considerations already made in relation to the diagram of FIG. 3.

That which is claimed is:

1. A multiplier circuit for a first signal and a second signal according to a multiplying factor proportional to an amplitude of the second signal, said multipler circuit comprising:
   a first degenerated differential stage;
   a second nondegenerated differential stage;
   an output stage comprising a first current mirror and a resistive load connected thereto;
   said first degenerated differential stage performing a linear to logarithmic conversion of said first signal for providing an input differential voltage for said second nondegenerated differential stage;
   said second nondegenerated differential stage performing a logarithmic to linear conversion of said input differential voltage for providing an input current to said first current mirror; and
   means for generating a current proportional to said second signal and forcing said current through said second nondegenerated differential stage, said means for generating a current comprising a second current mirror including a first diode-configured input transistor and a second output transistor, and respective degeneration resistors connecting the first diode-configured input transistor and the second output transistor to a supply node, an emitter area ratio between said first diode-configured input transistor and second output transistor being different from an emitter area ratio of respective degeneration resistors.

2. A multiplier circuit according to claim 1, wherein said second signal is a differential voltage signal.

3. A multiplier circuit according to claim 2, further comprising a third degenerated differential stage for converting said second differential voltage signal to an output current for forcing through said first diode-configured input transistor of said second current mirror.

4. A control circuit for a power factor correcting system comprising a control loop, the control circuit comprising:
   a multiplier circuit receiving at a first input a first signal representative of an error signal and receiving at a second input a second signal representative of a value of a supply voltage, said multiplier circuit having an increasingly nonlinear function characteristic for decreasing levels of said first signal, said multiplier circuit further comprising:
a first degenerated differential stage;
a second nondegenerated differential stage;
an output stage comprising a first current mirror and a resistive load connected thereto;
said first degenerated differential stage performing a linear to logarithmic conversion of said first signal for providing an input differential voltage for said second nondegenerated differential stage;
said second nondegenerated differential stage performing a logarithmic to linear conversion of said input differential voltage for providing an input current to said first current mirror; and
means for generating a current proportional to said second signal and forcing said current through said second nondegenerated differential stage, said means for generating a current comprising a second current mirror including a first diode-configured input transistor and a second output transistor, and respective degeneration resistors connecting the first diode-configured input transistor and the second output transistor to a supply node, an emitter area ratio between said first diode-configured input transistor and second output transistor being different from an emitter area ratio of respective degeneration resistors.

5. A control circuit according to claim 4, wherein said second signal is a differential voltage signal.

6. A control circuit according to claim 5, further comprising a third degenerated differential stage for converting said second differential voltage signal to an output current for forcing through said first diode-configured input transistor of said second current mirror.

7. A power factor correcting system comprising:
a control loop including a control circuit, said control circuit comprising a multiplier circuit receiving at a first input an error signal and receiving at a second input a second signal representative of a value of a supply voltage, said multiplier circuit having an increasingly nonlinear function characteristic for decreasing levels of said first signal, said multiplier circuit further comprising:
a first degenerated differential stage;
a second nondegenerated differential stage;
an output stage comprising a first current mirror and a resistive load connected thereto;
said first degenerated differential stage performing a linear to logarithmic conversion of said first signal for providing an input differential voltage for said second nondegenerated differential stage;
said second nondegenerated differential stage performing a logarithmic to linear conversion of said input differential voltage for providing an input current to said first current mirror; and
means for generating a current proportional to said second signal and forcing said current through said second nondegenerated differential stage, said means for generating a current comprising a second current mirror including a first diode-configured input transistor and a second output transistor, and respective degeneration resistors connecting the first diode-configured input transistor and the second output transistor to a supply node, an emitter area ratio between said first diode-configured input transistor and second output transistor being different from an emitter area ratio of respective degeneration resistors.

8. A power factor correcting system according to claim 7, wherein said second signal is a differential voltage signal.

9. A power factor correcting system according to claim 8, further comprising a third degenerated differential stage for converting said second differential voltage signal to an output current for forcing through said first diode-configured input transistor of said second current mirror.

10. A method for power factor correction, comprising the steps of:
providing a power factor correction system comprising a nonlinear multiplier circuit;
receiving at a first input of said nonlinear multiplier circuit a first signal representative of an error signal;
receiving at a second input of said nonlinear multiplier circuit a second signal representative of a value of a supply voltage;
providing an increasingly nonlinear function characteristic for decreasing levels of the first signal;
performing a linear to logarithmic conversion of the first signal via a first degenerated differential stage for providing an input differential voltage;
performing a logarithmic to linear conversion of the input differential voltage via a second nondegenerated differential stage;
providing an input current based upon the conversion of the input differential voltage to a first current mirror;
mirroring an output signal of the nonlinear multiplier circuit via the first current mirror; and generating a current proportional to the second signal and forcing the current through the second nondegenerated differential stage.

11. A method according to claim 10, further comprising the step of converting the second differential voltage signal via a third degenerated differential stage to an output current for forcing through a second current mirror.

12. A method according to claim 10, wherein the first signal is representative of a supply voltage.

13. A method according to claim 10, wherein the second signal is an error signal derived from a feedback line.

14. A method according to claim 11, wherein the second current mirror includes a first diode-configured input transistor and a second output transistor, and respective degeneration resistors connecting the first diode-configured input transistor and the second output transistor to a supply node, an emitter area ratio between said first diode-configured input transistor and second output transistor being different from an emitter area ratio of respective degeneration resistors, said method further comprising the step of ensuring that a voltage drop on said respective degeneration resistors is not the same for said first current mirror.

15. A method for providing nonlinear multiplication for a first signal according to a multiplying factor proportional to an amplitude of a second signal, the method comprising the steps of:
performing a linear to logarithmic conversion of the first signal via a first degenerated differential stage for providing an input differential voltage;
performing a logarithmic to linear conversion of the input differential voltage via a second nondegenerated differential stage;
providing an input current based upon the conversion of the input differential voltage to a first current mirror;

mirroring an output signal via the first current mirror; and generating a current proportional to the second signal and forcing the current through the second nondegenerated differential stage.

16. A method according to claim 15, further comprising the step of converting the second differential voltage signal via a third degenerated differential stage to an output current for forcing through a second current mirror.

17. A method according to claim 15, wherein the first signal is representative of a supply voltage.

18. A method according to claim 15, wherein the second signal is an error signal derived from a feedback line.

19. A method according to claim 16, wherein the second current mirror includes a first diode-configured input transistor and a second output transistor, and respective degeneration resistors connecting the first diode-configured input transistor and the second output transistor to a supply node, an emitter area ratio between said first diode-configured input transistor and second output transistor being different from an emitter area ratio of respective degeneration resistors, said method further comprising the step of ensuring that a voltage drop on said respective degeneration resistors is not the same for said first current mirror.

* * * * *